UNITED STATES PATENT OFFICE.

JAMES GUY LA FONTE, OF INDIANAPOLIS, INDIANA, ASSIGNOR TO HIRAM G. FARR, OF SAME PLACE.

IMPROVEMENT IN TREATMENT OF WOOD FOR CORSET-STAYS, &c.

Specification forming part of Letters Patent No. 201,022, dated March 5, 1878; application filed August 16, 1877.

*To all whom it may concern:*

Be it known that I, JAMES GUY LA FONTE, M. D., of Indianapolis, in the county of Marion and State of Indiana, have invented a certain new and useful Mode of Preparing Wood for Stays for Dresses and Corsets and other purposes, of which the following is a specification:

My invention consists, first, in a new article of manufacture, produced by steeping wood in a chemical preparation of gums and other matter, to render it permanently pliable and durable and impervious to moisture, adapting it for use as stays for corsets and dresses, and for many other useful purposes, as hereinafter described.

The invention further consists of the process, herein described, of preparing wood by steeping it in a preparation of carbolic acid and glycerine, with a solution of shellac or other gum and asphaltum or its equivalent.

The invention further consists in the combined process of chemical treatment and dyeing of the wood, to give it an appearance of whalebone, as hereinafter described.

In carrying out my invention, I take one ounce of carbolic-acid crystals, dissolved in about as small a quantity of water as practicable, and mix it with one ounce of glycerine. I further take one ounce of gum-shellac, or other gum of like nature, one ounce of petroleum, asphaltum, or any known and suitable equivalent therefor possessing similar properties, and dissolve the gum and the asphaltum in alcohol or ether, and mix this with the first mixture or combined solution.

The kinds of wood preferred for my purpose are the second growth of hickory, pecan, oak, or ash; but some other varieties of timber may be used to good advantage. The wood is cut into boards, and then, by means of gangs of small saws or knives, is recut to the thickness, width, and length desired. It is then ready for the chemical process. It is then soaked in the solution above described from twelve to twenty-four hours at a moderate temperature—say 100° Fahrenheit. It is then taken from the chemical solution, and dried on suitable racks.

If it is desired to color the wood to imitate whalebone or other material, it is then steeped in a coloring solution.

A solution suitable for coloring the wood to represent whalebone is made as follows: One ounce extract of logwood; two ounces sulphate of iron, dissolved in warm water, and added to each gallon of soft water.

The chemically-prepared wood is steeped in this coloring solution from twelve to twenty-four hours, and again dried. If preferred, the coloring mixture may be applied to the first chemical solution, so that the chemical treatment and coloring are performed at one operation.

After the wood is thoroughly dried it is smoothed by means of sand-paper, or preferably by a longitudinal reciprocating movement, imparted to it in a rummaging-box which I have contrived for the purpose, and which will be made the subject of a separate application for Letters Patent. After rummaging, the colored strips are rubbed with a cloth saturated in raw linseed-oil, which sets and deepens the color and imparts a polish to the surface. The material is afterward bundled in suitable packages for market.

The treatment renders the wood durable, makes and keeps it pliable, and effectually protects it from dampness, so that it is not affected by perspiration.

My prepared wood affords a valuable and economical substitute for whalebone and horn for many purposes for which these costly materials are used. It furnishes an excellent material for stays for dresses and corsets, for springs, for bustles and skirts, for the manufacture of whips, canes, fans, fishing-rods, carriage-wheels, and many other articles.

Having thus described my invention, the following is what I claim as new and desire to secure by Letters Patent—

1. The process herein described of rendering wood permanently pliant, consisting of treatment with carbolic acid, glycerine, shellac, and asphaltum.

2. As an article of manufacture, wood rendered permanently pliant by treatment with carbolic acid, glycerine, shellac, and asphaltum, substantially in the manner set forth.

JAMES GUY LA FONTE.

Witnesses:
EMMET S. STILLWELL,
B. W. DAKIN.